US012656703B2

(12) United States Patent
Usui et al.

(10) Patent No.: US 12,656,703 B2
(45) Date of Patent: Jun. 16, 2026

(54) IMAGE FORMING APPARATUS

(71) Applicant: CANON KABUSHIKI KAISHA, Tokyo (JP)

(72) Inventors: Masatake Usui, Shizuoka (JP); Hiroki Eguchi, Kanagawa (JP); Kenji Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 18/755,443

(22) Filed: Jun. 26, 2024

(65) Prior Publication Data

US 2025/0004392 A1 Jan. 2, 2025

(30) Foreign Application Priority Data

Jun. 29, 2023 (JP) ................................ 2023-106882

(51) Int. Cl.

*G03G 15/01* (2006.01)
*G03G 15/00* (2006.01)
*G03G 15/20* (2006.01)

(52) U.S. Cl.

CPC ..... *G03G 15/0189* (2013.01); *G03G 15/0126* (2013.01); *G03G 15/2017* (2013.01); *G03G 15/2064* (2013.01); *G03G 15/6585* (2013.01)

(58) Field of Classification Search

CPC ........... G03G 15/0126; G03G 15/0178; G03G 15/0189; G03G 15/0194; G03G 15/6585
See application file for complete search history.

(56) References Cited

U.S. PATENT DOCUMENTS

2005/0105941 A1 5/2005 Usui
2006/0140677 A1* 6/2006 Fukatsu ............. G03G 15/2064 399/223
2014/0193751 A1 7/2014 Sugitate
2022/0035264 A1 2/2022 Yamashita

FOREIGN PATENT DOCUMENTS

JP H05197256 A 8/1993
JP 5441386 B2 3/2014

* cited by examiner

*Primary Examiner* — Thomas S Giampaolo, II
(74) *Attorney, Agent, or Firm* — Canon U.S.A., Inc. IP Division

(57) ABSTRACT

An image forming apparatus can include an image forming unit that prints a plurality of toner images formed by using toners of first, second and third toners onto a recording material in a superimposed manner, the image forming unit forms first to third toner images; a transfer unit for transferring onto the recording material in a superimposed manner the first to third toner images in this order, which is an order closer to the recording material; and a fixing unit including heating unit for heating the recording material from the side where the toner images are transferred, the fixing unit being configured to heat and melt the toner images to fix the toner images onto the recording material. Among the first to third toners, the first toner has the highest elastic modulus, and the second toner has the lowest elastic modulus.

8 Claims, 7 Drawing Sheets

IMAGE FORMING APPARATUS

BACKGROUND

Field

The present disclosure relates to an image forming apparatus.

Description of the Related Art

Conventionally, in image forming apparatuses using an electrophotographic system and an electrostatic recording system, such as laser beam printers, copying machines, and fax machines, toner images are formed on an image bearing member, such as a photosensitive member and an intermediate transfer member, by an appropriate image forming process. The toner image is transferred onto a recording material by transfer unit, and then fixed onto the recording material by a fixing unit having heating unit serving as fixing unit. Then, the recording material having the toner image fixed thereon is output as an image forming product from the image forming apparatus.

In recent years, full colorization of electrophotographic image forming apparatuses has been developed. Some of such color image forming apparatuses employ a system in which toner images of four colors of yellow, magenta, cyan, and black are transferred onto a recording material one by one in a superimposed manner and then the transferred toner images of the plurality of colors are fixed to the recording material by a fixing unit. In such color image forming apparatuses, in order to achieve wide color reproducibility and chroma of full color images, toners whose viscoelastic characteristics when melted by the fixing unit are low are used to improve color mixing performance of the toners of the colors.

Forming a color photographic image requires high gloss. Forming a black character image in monochrome printing, on the other hand, requires low gloss as well. Thus, there is a technology for increasing the viscoelastic characteristic of black toner to be higher than those of other toners so as to decrease the gloss value of black. In order to satisfy both the requirements, Japanese Patent Application Publication No. H05-197256 proposes a technology in which only black toner is used to form an image with a low gloss value in monochrome printing (single-color black) while toner images of four colors of yellow, magenta, cyan, and black are superimposed to form what is called process black so as to increase the gloss value in color image printing. Then, toners are superimposed such that toner with a lower gloss value is located closer to a recording material and toner with a higher gloss value is located closer to heating unit to form a black image, and the toners are collectively heated, melted, and fixed to prevent image gloss unevenness.

In the case where toner, whose viscoelastic characteristic when melted by a fixing unit is low, is used, if toner with a high gloss value receives excessive heat from heating unit, toner may be attached to a fixing member. This is called hot offset. When the hot offset occurs, the image surface after fixing becomes coarse and reflected light is scattered, and hence there is a problem in that the gloss value decreases.

SUMMARY

The present disclosure has been made in order to solve the above-mentioned problem, and it is an object thereof to print both an image with a high gloss value and an image with a low gloss value without causing hot offset when printing a black image in an image forming apparatus capable of color printing.

According to some embodiments, an image forming apparatus can be configured to form a plurality of toner images by using toner of a plurality of colors and superimpose the plurality of toner images to perform printing on a recording material, the plurality of toners including a first toner, a second toner, and a third toner of different colors, the image forming apparatus can include:

an image forming unit configured to form a first toner image using the first toner, a second toner image using the second toner, and a third toner image using the third toner;

a transfer unit for transferring in a superimposed manner onto the recording material the first toner image, the second toner image, and the third toner image in this order, which is an order closer to the recording material; and a fixing unit having heating unit for heating the recording material from a side where the toner image is transferred, the fixing unit being configured to heat and melt the toner image by the heating unit and fix the toner image onto the recording material, wherein, among the first toner, the second toner, and the third toner, the first toner has a highest elastic modulus, and the second toner has a lowest elastic modulus.

As described above, according to the present disclosure, both an image with a high gloss value and an image with a low gloss value can be printed without causing hot offset when a black image is printed in an image forming apparatus capable of color printing.

Further features of the present disclosure will become apparent from the following description of exemplary embodiments with reference to the attached drawings.

DESCRIPTION OF THE EMBODIMENTS

Figure 1:
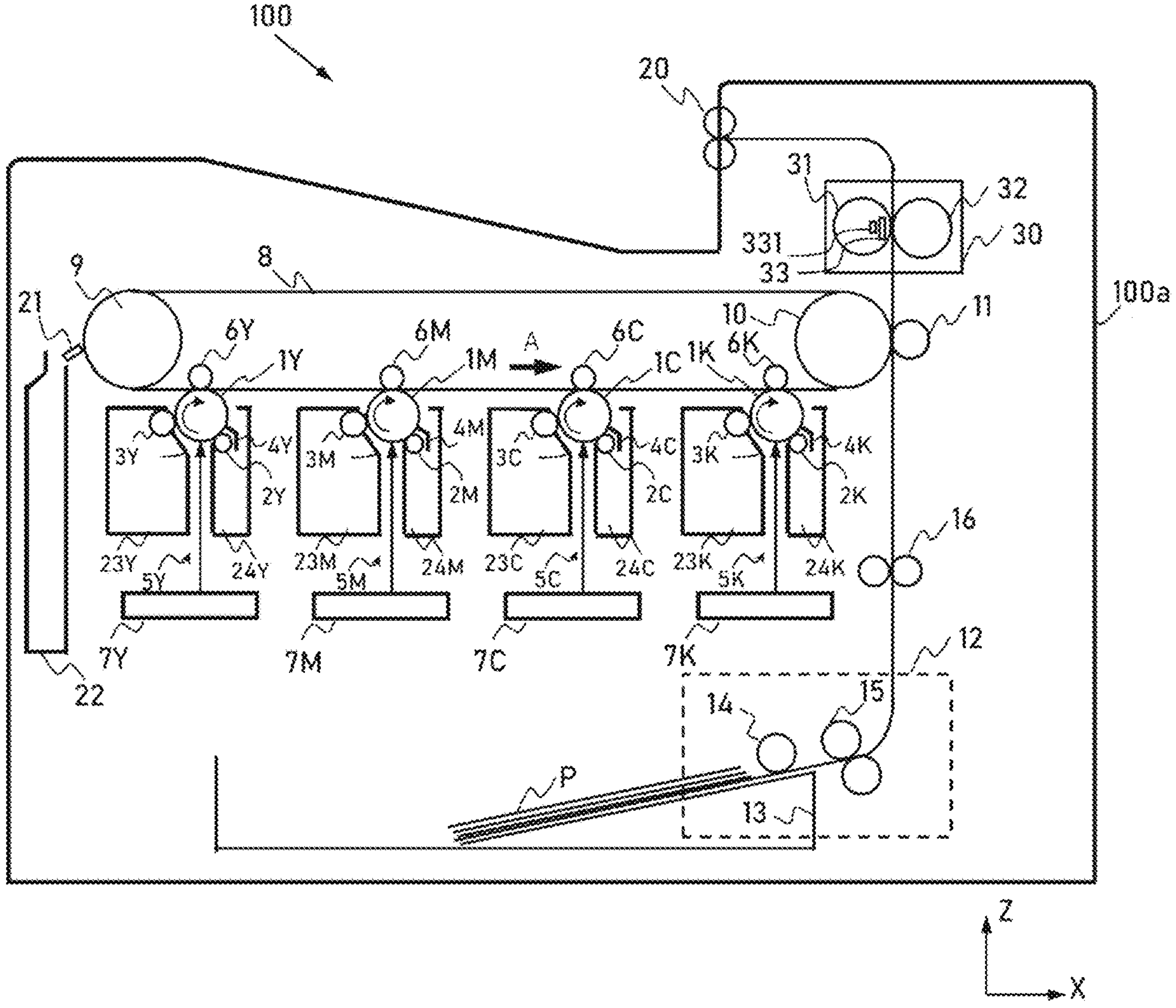
FIG. 1 is a schematic transverse cross-sectional diagram of a color image forming apparatus.

Referring to the drawings, various exemplary embodiments, features, and aspects of the present disclosure are described in detail below in an illustrative manner. Note that the following embodiments are not intended to limit the disclosure according to the claims, and all of combinations of features described in the embodiments are not necessarily required for the solution in the present disclosure.

Furthermore, the dimensions, materials, shapes, and relative arrangements of the components described in the embodiments are not intended to limit the claims thereto unless otherwise specified. Furthermore, in the following description, the materials and shapes of members described once are the same in the latter description as in the first description unless otherwise specified. Well-known technologies and publicly known technologies can be applied to configurations and steps that are not particularly illustrated or described. Furthermore, overlapping descriptions are sometimes omitted.

Example 1

Image Forming Apparatus

First, the outline of an overall configuration of an image forming apparatus in Example 1 is described.

FIG. 1 is a schematic transverse cross-sectional diagram of a multi-color laser printer using an electrophotographic image forming process as the image forming apparatus in Example 1. An image forming apparatus 100 includes process stations (process cartridges) 5Y, 5M, 5C, and 5K that are detachably attached to an apparatus main body 100*a*. The four cartridges 5Y, 5M, 5C, and 5K have the same structures, but are different in that the cartridges form images by toners (developers) of different colors, that is, yellow (Y), magenta (M), cyan (C), and black (K). Note that the symbols YMCK are omitted below unless description is given on a particular cartridge. Each cartridge 5 has a toner container 23, a photosensitive drum 1 as a photosensitive member, a charging roller 2, a developing roller 3, a cleaning blade 4, and a waste toner container 24. An exposure device 7 disposed below the cartridge 5 exposes the photosensitive drum 1 to light on the basis of an image signal corresponding to each piece of image data of yellow, magenta, cyan, and black.

The photosensitive drum 1 is uniformly charged with a predetermined polarity and a predetermined potential by the charging roller 2 in a rotating process. After that, the photosensitive drums 1Y to 1K are exposed to light by the exposure devices 7Y to 7K, respectively, such that electrostatic latent images corresponding to first to fourth color component images are formed. The first to fourth color component images are color component images for forming intended color images, and correspond to yellow, magenta, cyan, and black, respectively. The charging roller 2 rotates while being driven along with the rotation of the photosensitive drum 1.

The developing roller 3 attaches toner T to an electrostatic latent image formed on the photosensitive drum 1, and develops the toner T as a toner image. The toner T in the toner container 23 is negative-charging non-magnetic single-component toner, and the development of the electrostatic latent image is performed by a non-magnetic single-component toner contact developing system. The developing roller 3 is applied with voltage from a power source (not shown), thereby performing the development.

An intermediate transfer belt unit is configured by an intermediate transfer belt 8, a drive roller 9, a secondary transfer opposed roller 10, a belt cleaning blade 21, and a belt toner box 22. Furthermore, in the intermediate transfer belt unit, primary transfer rollers 6Y to 6K are disposed at positions opposed to the photosensitive drums 1Y to 1K on the inner side of the intermediate transfer belt 8. When the drive roller 9 is rotated by a motor (not shown), the intermediate transfer belt 8 is rotationally moved in the direction of arrow A, and the secondary transfer opposed roller 10 accordingly rotates while being driven. Furthermore, each photosensitive drum 1 rotates in the direction of arrow. In this case, when the primary transfer roller 6 is applied with a primary transfer voltage having positive polarity from the power source, toner images on the photosensitive drums 1 are primarily transferred onto the intermediate transfer belt 8 sequentially in the order from a toner image on the photosensitive drum 1Y. In the image forming apparatus in Example 1, when toners of four colors are primarily transferred, toner images are stacked in the order of yellow, magenta, cyan, and black from the side closer to the intermediate transfer belt 8.

After that, the toner images of four colors are transported to a secondary transfer roller 11 while being stacked on the intermediate transfer belt 8. The cleaning blade 4 in the photosensitive drum 1 contacts with the photosensitive drum 1, and removes residual toner that has remained on the surface of the photosensitive drum 1 without being primarily transferred to the intermediate transfer belt 8 and other residues on the photosensitive drum. Furthermore, the belt cleaning blade 21 contacts with the intermediate transfer belt 8 stretched over the drive roller 9, and removes residual toner that has remained on the surface of the intermediate transfer belt 8 without being secondarily transferred to a recording material P in secondary transfer described later and residues on other residues on the intermediate transfer belt 8.

Figure 2:
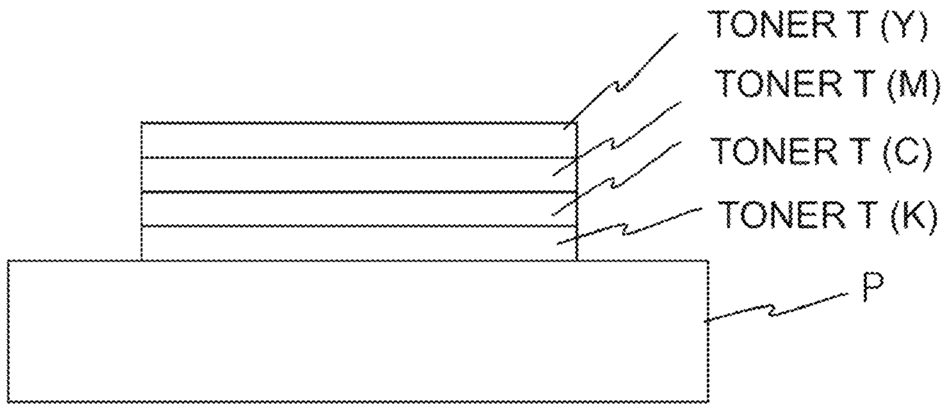
FIG. 2 is a diagram illustrating how toners are superimposed when transferred to a recording material P.

A feed transporting device 12 has a feeding roller 14 for feeding a recording material P from the inside of a feeding cassette 13 that stores the recording material P therein, and a transporting roller pair 15 for transporting the fed recording material P. Then, the recording material P transported from the feed transporting device 12 is transported to the secondary transfer roller 11 by a registration roller pair 16. In the secondary transfer from the intermediate transfer belt 8 to the recording material P, by applying a voltage having a positive polarity to the secondary transfer roller 11, toner images on the intermediate transfer belt 8 that have the toners T of four colors superimposed thereon are transferred to the transported recording material P. FIG. 2 illustrates how the toners are superimposed when the toner images of four colors are transferred to the recording material P. The toner images are superimposed in the order of black (K), cyan (C), magenta (M), and yellow (Y) from the side closer to the recording material P in a manner reverse to the toner images on the intermediate transfer belt 8. The arrangement of the image forming units in the transporting direction of the intermediate transfer belt 8 is set such that toner images are superimposed in the order as indicated in Example 1 when the toner images are transferred to the recording material in a superimposed manner.

The recording material P having the toner images transferred thereon is transported to a fixing unit 30 serving as fixing unit. The fixing unit 30 is a film heating type fixing unit including a fixing film 31 and a pressure roller 32 for bringing the recording material P into pressure contact with the fixing film 31. A fixing heater 33 and a thermistor 331 for measuring the temperature of the fixing heater 33 are built in the fixing film 31. Then, when the fixing unit 30 heats and pressurizes the recording material P, the toner images are fixed on the recording material P. After that, the recording material P passes through a discharge roller 20 and is discharged to the outside of the image forming apparatus 100.

Fixing Means

Figure 3:
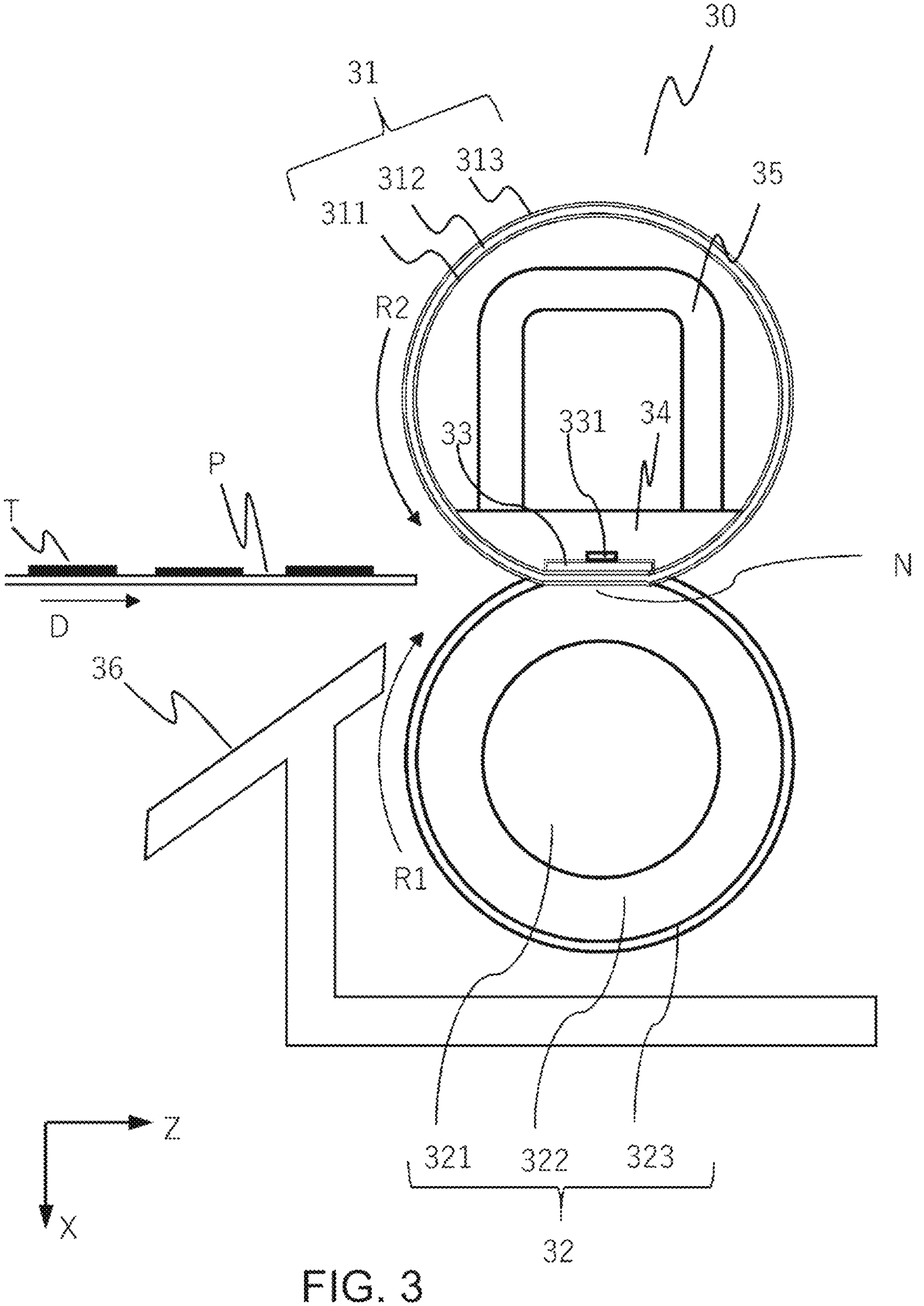
FIG. 3 is a schematic cross-sectional diagram of a fixing unit.

Next, the outline of an overall configuration of the fixing unit 30 as fixing unit mounted in the image forming apparatus 100. FIG. 3 is a schematic transverse cross-sectional diagram of the fixing unit 30 in Example 1. For the sake of description, the fixing unit 30 in FIG. 3 is rotated by about 90 degrees in the right direction with respect to the arrangement illustrated in FIG. 1 (XZ coordinate axes are illustrated in FIG. 1 and FIG. 3). Note that a toner T on a recording material P is any one of toners of yellow, magenta, cyan, and black or freely selected from the toners and superimposed.

The fixing unit 30 in Example 1 has the fixing film 31, the pressure roller 32, and an inlet guide 36. The fixing film 31 contains the fixing heater 33, a heater holder 34, a pressure stay 35, and the thermistor 331 therein.

The fixing film 31 is a member formed into an endless film shape provided with an elastic layer 312 and a surface layer 313 on the outer circumferential surface of a base layer 311. The elastic layer 312 is formed of an elastic material having heat resistance, such as silicone rubber, for the purpose of improving fixability and making gloss values uniform. The surface layer 313 is formed of an easily releasable material, such as fluorine resin, for the purpose of improving releasability from the recording material P and suppressing offset in which toner T is attached to the surface layer 313.

The pressure roller 32 has a core portion 321, at least one elastic layer 322, and a surface layer 323. The elastic layer 322 is formed of an elastic material having heat resistance, such as silicone rubber or fluorine rubber, in order to secure the width of a fixing nip portion N described later. The surface layer 323 is formed of an easily releasable material having heat resistance, such as fluorine resin, in order to prevent contamination due to toner and paper dust. In Example 1, the pressure roller 32 having an outer diameter of 25 mm (millimeters) was employed.

The fixing heater 33 is a plate-shaped heat generating member for quickly heating the fixing film 31 while contacting with the inner circumferential surface of the fixing film 31. The fixing heater 33 is disposed over a region to be opposed to the fixing nip portion N. The plate-shaped heat generating member has a configuration in which an energization heat generating resister layer is formed on a ceramic substrate by screen printing. The temperature of the fixing heater 33 is detected by the thermistor 331 as temperature detection unit that contacts a surface of the substrate on the side opposite to the surface that contacts with the fixing film 31. Then, by temperature control unit (not shown), the energization to the energization heat generating resister layer is controlled such that the fixing heater 33 has a predetermined target temperature on the basis of a detection signal of the thermistor 331.

The heater holder 34 holds the fixing heater 33. The pressure stay 35 is formed of a member having rigidity, and applies a pressure force received from pressure unit (not shown) to the pressure roller 32 through the heater holder 34. Due to the pressure force, a fixing nip portion N having a predetermined width is formed between the fixing film 31 and the pressure roller 32 from a leading end to a trailing end.

Next, a fixing process by the fixing unit 30 is described. The pressure roller 32 is rotationally driven by drive unit (not shown) in a direction of the arrow R1. Then, the fixing film 31 rotates in a direction of the arrow R2 while being driven along with the rotation of the pressure roller 32. The fixing heater 33 quickly increases its temperature to heat the fixing film 31. In the state in which the fixing heater 33 is controlled to a predetermined target temperature, the recording material P is guided to the fixing nip portion N along the inlet guide 36, and is sandwiched and transported in a direction of the arrow D as a transporting direction by the fixing film 31 and the pressure roller 32. In the transporting process, heat and pressure are applied to the recording material P, so that an unfixed toner image T is fixed.

Control Block Diagram

Figure 4:
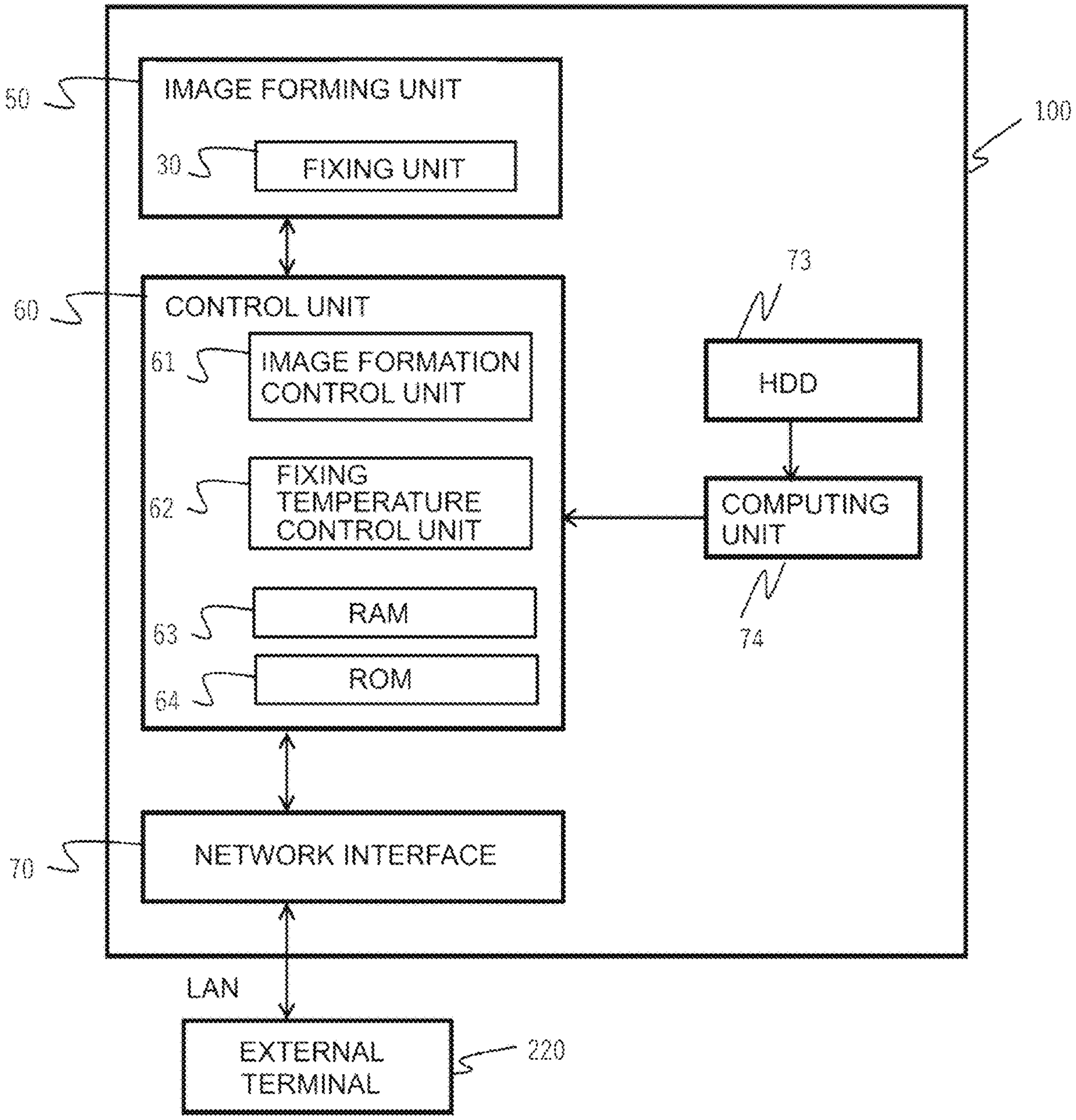
FIG. 4 is a control block diagram of an image forming apparatus.

Next, control blocks in the image forming apparatus 100 related to the practical examples in the present disclosure are described. FIG. 4 is a control block diagram of the image forming apparatus 100 in Example 1. A control unit 60 may be a central processing unit (CPU) including one or more processors, circuitry, or combinations thereof for controlling the entire image forming apparatus 100. A random access memory (RAM) 63 is a working memory, and a read only memory (ROM) 64 stores programs for controlling the image forming apparatus therein. The control unit 60 operates in accordance with programs and user instructions, and functions as an image forming control unit 61 and a fixing temperature adjustment control unit 62. The image forming control unit 61 performs control of operating an image forming unit 50 serving as image forming unit and printing an image on a recording material P on the basis of image information transmitted from a terminal. The fixing temperature adjustment control unit 62 controls the temperature of the fixing heater 33 in the fixing unit 30 to a predetermined temperature on the basis of a detection result of the thermistor 331 as a temperature detection element.

A network interface 70 is connected to an external terminal 220 used by a user through a local area network (LAN) or the like, and inputs and outputs image information and device information between the external terminal 220 and the image forming apparatus 100 (communication processing). A hard disk drive (HDD) 73 as storage unit is a hard disk drive. In the HDD 73, system software and the like may be stored. As the storage unit other than the hard disk, a writable non-volatile memory such as a semiconductor memory may be used. A computing unit 74 can convert image information in a red, green, blue (RGB) display system transmitted from a terminal into pieces of image data of yellow, magenta, cyan, and black by using information stored in the HDD 73, and outputs the resultant. In the case where the computing unit 74 converts a black image into image data, when the image is recognized as a black character image, single-color black image data is set. On the other hand, when the image is recognized as an image such as a photo, process black image data formed by superimposing yellow, magenta, cyan, and black is set for a black color part in the image. The hardware configuration of the image forming apparatus in Example 1 has been described above. Note that the hardware configuration is illustrative, and the configuration is not limited thereto.

Descriptions of Verification and Consideration

As an index of softness of toner, a storage elastic modulus as a viscoelasticity characteristic of toner was used to perform verification and consideration. Samples of toners having different storage elastic moduli were formed to compare Example 1 and Comparative example 1. Note that the index used is not limited to the storage elastic modulus and any index that can express the softness of toner can be used.

Figure 5:
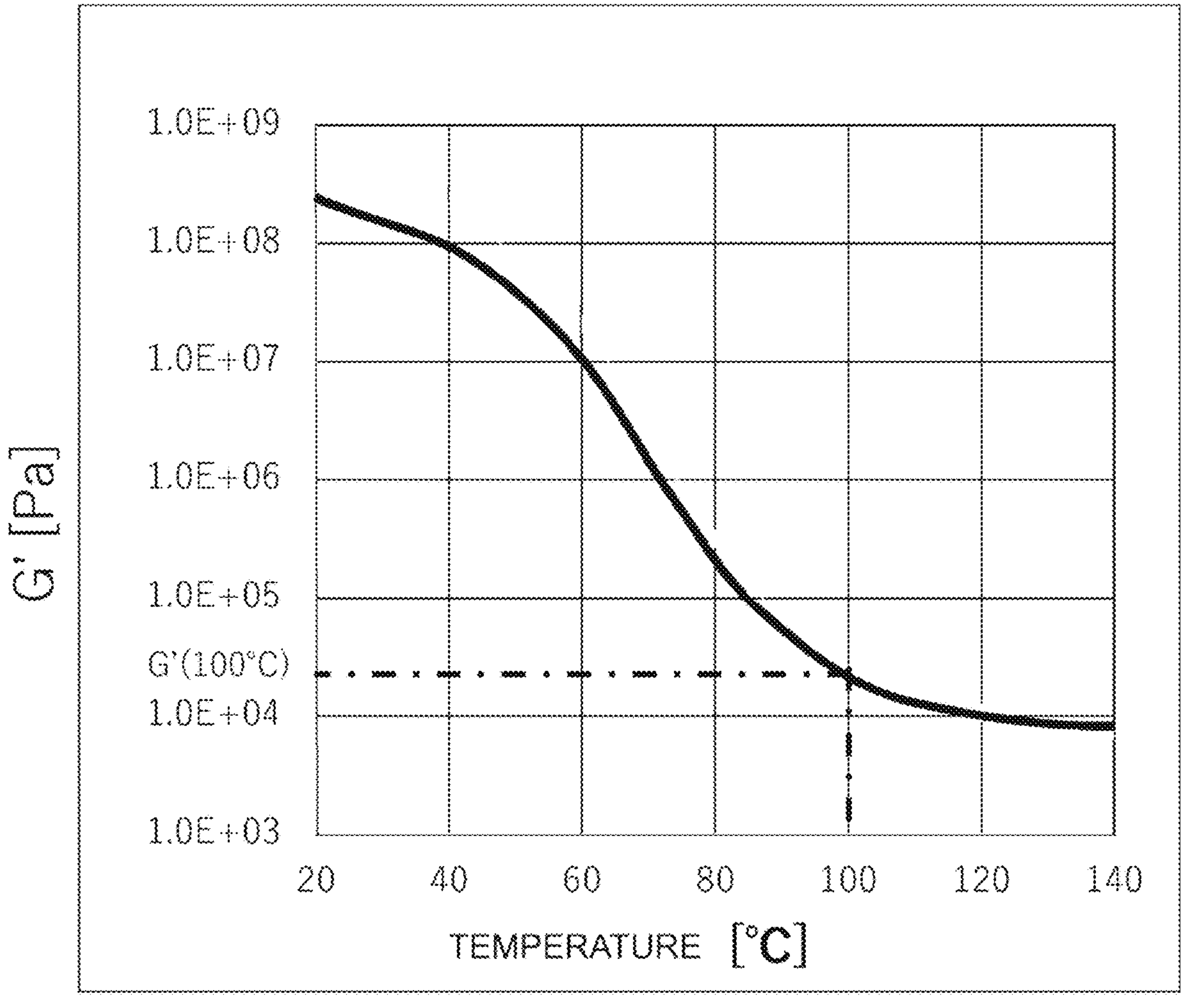
FIG. 5 is a diagram illustrating an example of a measurement result of a storage elastic modulus of toner.

FIG. 5 is an example of a measurement result of the storage elastic modulus of toner. The horizontal axis indicates temperature [° C.], and the vertical axis indicates storage elastic modulus G' [Pa]. As its representative value, a storage elastic modulus G' (100° C.) at 100° C. was obtained. In this case, storage elastic modulus G' (100° C.)=2.2×104 Pa (pascal) was established. Here, in the fixing, the temperature of toner on the recording material P was increased to about 100° C. (Celsius) while passing through the fixing nip portion N in the fixing unit 30, and hence the storage elastic modulus G' (100° C.) at 100° C. was used as an index.

By changing the viscoelastic characteristic of toner such as a storage elastic modulus during melting in the fixing unit 30, the gloss value can be changed. A toner having a high storage elastic modulus G' (100° C.) is a toner having a low gloss value. Furthermore, a toner having a high storage elastic modulus G' (100° C.) is hard, and hence the toner is difficult to melt and spread, so that unevenness on the surface of the toner easily remains. When the unevenness occurs, reflected light is scattered, and the gloss value is low. For implementing the low gloss of characters, the storage elastic modulus G' (100° C.) of black toner is designed to be high. On the other hand, a toner having a low storage elastic modulus G' (100° C.) is a toner having a high gloss value. A toner having a low storage elastic modulus G' (100° C.) is soft, and hence the toner easily melts and spreads, so that the surface of the toner easily becomes smooth. When the surface of the toner is smooth, reflected light is difficult to scatter, and hence the gloss value increases.

Description of Toner Viscoelastic Characteristic

First, a method of measuring the storage elastic modulus is described. The storage elastic modulus of toner T is measured by using a dynamic viscoelasticity measurement device (rheometer) ARES (made by Rheometric Scientific). As a measurement jig, a serrated parallel plate having a diameter of 7.9 mm is used. Note that the measurement method is not limited thereto, and a freely selected device and method may be used.

As a measurement sample, a sample of 0.1 g is molded into a cylindrical sample having a diameter of 8 mm and a height of 2 mm by using a pressure molding machine (15 kN (kilonewtons) is maintained at room temperature for 1 minute). As the pressure molding machine, a 100-kN press NT-100H made by NPa SYSTEM CO., LTD. is used.

The temperature of the serrated parallel plate is controlled to 120° C., and the cylindrical sample is heated and melted such that sawteeth are dug, and load is applied in the vertical direction such that the axial force does not exceed 30 (gf) (0.294 N), thereby fixing the sample to the serrated parallel plate. In this case, a steel belt may be used such that the diameter of the sample and the diameter of the parallel plate becomes equal. The serrated parallel plate and the cylindrical sample are gradually cooled to a measurement start temperature 30.00° C. for 1 hour.

Measurement frequency: 6.28 rad/sec

Setting of measurement distortion: an initial value is set to 0.1%, and measurement is performed in an automatic measurement mode.

Correction of elongation of sample: adjusted in an automatic measurement mode.

Measurement temperature: increased from 30° C. to 140° C. at a proportion of 2° C. per minute.

Measurement interval: viscoelasticity data is measured with an interval of 30 seconds, that is, every 1° C.

Table 1 indicates values of storage elastic moduli G' (100° C.) of toners of yellow, magenta, cyan, and black in Example 1 and Comparative example 1.

TABLE 1

| | Yellow | Magenta | Cyan | Black |
|---|---|---|---|---|
| Example 1 | $3.5 \times 10^4$ Pa | $2.2 \times 10^4$ Pa | $1.5 \times 10^4$ Pa | $5.0 \times 10^4$ Pa |
| Comparative Example 1 | $1.5 \times 10^4$ Pa | $2.2 \times 10^4$ Pa | $3.5 \times 10^4$ Pa | $5.0 \times 10^4$ Pa |

A toner layer disposed at a position closest to the recording material P is referred to as "lower layer toner", a toner layer disposed at a position farthest from the recording material P is referred to as "upper layer toner", and a toner layer disposed between the lower layer toner and the upper layer toner is referred to as "intermediate layer toner". In the example in FIG. 2, black is the lower layer toner, yellow is the upper layer toner, and cyan and magenta are the intermediate layer toners. Cyan closer to the lower layer toner is also referred to as "first intermediate layer toner", and magenta closer to the upper layer toner is also referred to as "second intermediate layer toner". Note that which position yellow, cyan, and magenta are disposed at among the upper layer and the intermediate layer may be determined depending on the elastic modulus, and is not limited to Example 1.

From the table, the storage elastic modulus G' (100° C.) in Example 1 is highest for black as the lower layer toner, and lowest for cyan as the intermediate layer toner. The storage elastic modulus G' (100° C.) of yellow as the upper layer toner is lower than that of the lower layer toner and higher than that of the intermediate layer toner. In other words, the storage/elastic moduli G' (100° C.) are in the order of intermediate layer toner<upper layer toner<lower layer toner. More specifically, the storage elastic moduli G' (100° C.) are in the order of C (first intermediate layer toner)<M (second intermediate layer toner)<Y (upper layer toner)<K (lower layer toner).

On the other hand, the storage elastic modulus G' (100° C.) in Comparative example 1 is highest for black as the lower layer toner, and lowest for yellow as the upper layer toner. The storage elastic moduli G' (100° C.) of magenta and cyan as the intermediate layer toners are lower than that of the lower layer toner and higher than that of the upper layer toner. In other words, the storage elastic moduli G' (100° C.) are in the order of upper layer toner<intermediate layer toner<lower layer toner. More specifically, the storage elastic moduli G' (100° C.) are in the order of Y (upper layer toner)<M (second intermediate layer toner)<C (first intermediate layer toner)<K (lower layer toner).

Table 2 indicates a result of comparison experiment using Example 1 and Comparative example 1. Table 2 indicates gloss values after toners of yellow, magenta, cyan, and black are fixed in a process black state on the recording material P. Furthermore, Table 2 indicates gloss values of single-color black as reference values. The recording material P used in this measurement is "Futura80lb (made by VERSO) with a basis weight of 216 $g/m^2$". Furthermore, gloss values at an incident angle of 75° are measured by using PG-1 (made by NIPPON DENSHOKU INDUSTRIES Co., Ltd.).

TABLE 2

| | Process black | (Reference) Single color black |
|---|---|---|
| Example 1 | 58 | 18 |
| Comparative Example 1 | 40 | 18 |

Example 1 achieves high gloss in process black as compared to Comparative example 1. This is because, in Example 1, the storage elastic modulus G' (100° C.) of yellow as the upper layer is relatively high among color toners, which indicates that yellow toner is resistant to heat and hot offset is difficult to occur. As a result, the surface of toner after fixing is smooth, and hence reflected light is difficult to scatter and the gloss value increases. In Comparative example 1, on the other hand, the storage elastic modulus G' (100° C.) of yellow as the upper layer is relatively low among color toners, which indicates that yellow toner is less resistant to heat and hot offset easily occurs. As a result, the surface of toner after fixing is coarse, and hence reflected light is scattered and the gloss value decreases.

Note that, in single-color black indicated as reference values, the storage elastic modulus of black toner is high and hence low gloss is achieved. Furthermore, the storage elastic moduli of black toner in Example 1 and Comparative example 1 are equal, and hence the gloss values are the same value.

As described above, the image forming apparatus in Example 1 uses process black to enable a black image with high gloss that supports a photographic image without causing hot offset. In addition, according to Example 1, single-color black is used to enable a low gloss image that supports black characters.

Modification

Next, a derivative form of Example 1 is described as a modification. In the derivative form of Example 1, the pressure profile of the fixing nip portion N in the fixing unit 30 was changed.

Figure 6A:
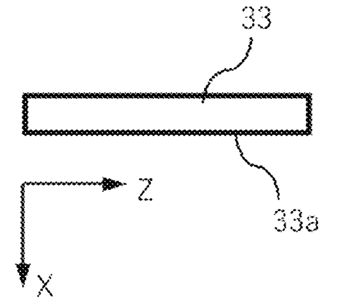
FIG. 6A to FIG. 6D are pressure profiles in a transporting direction of a recording material.
Figure 6B:
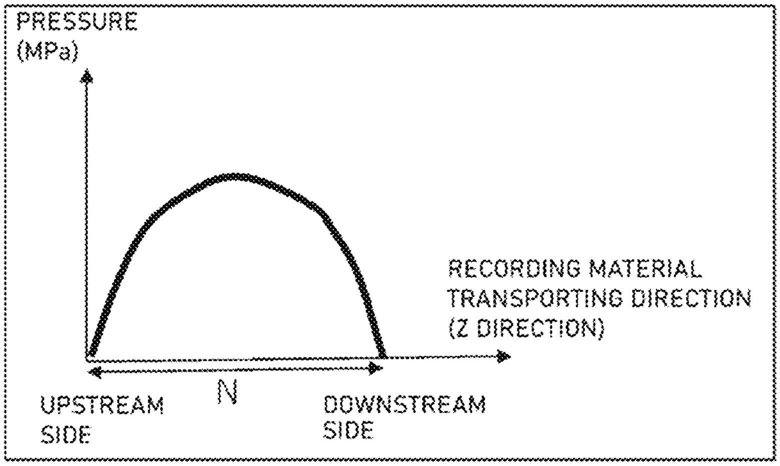

FIG. 6A illustrates the shape of the fixing heater 33 in Example 1. The lower surface in the figure is a contact surface 33*a* for the fixing film 31. The contact surface 33*a* has a flat shape. FIG. 6B illustrates a pressure profile of the fixing nip portion N in Example 1 in the recording material transporting direction. The fixing heater 33 has a flat shape, and hence the pressure profile is symmetric about the upstream and downstream sides of the recording material transporting direction.

Figure 6C:
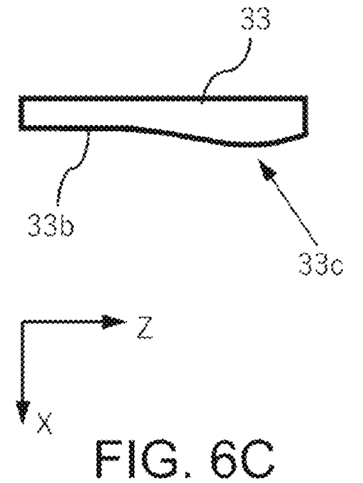
Figure 6D:
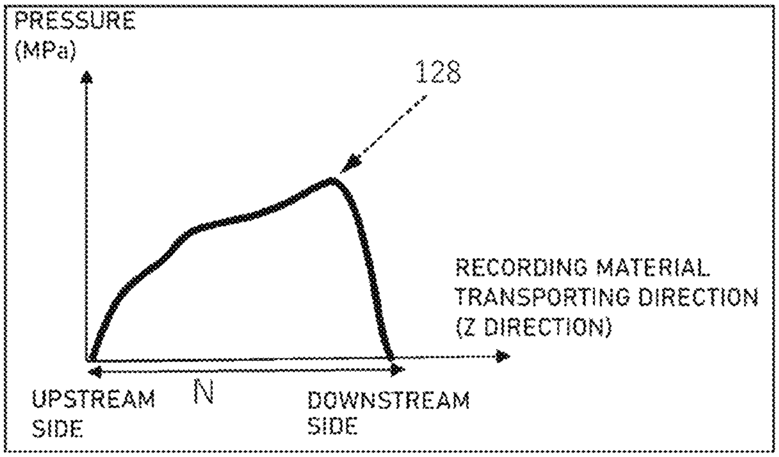

FIG. 6C illustrates the shape of a fixing heater 33 in this modification. The lower surface in the figure is a contact surface 33*b* for the fixing film 31. The contact surface 33*b* is changed to a shape having a protruding shape 33*c* that protrudes toward the pressure roller 32. FIG. 6D illustrates a pressure profile of the fixing nip portion N in this modification in the recording material transporting direction. The downstream side of the fixing heater 33 has the protruding shape 33*c*, and hence the pressure profile indicates that pressure is high on the downstream side of the recording material transporting direction. In other words, when the recording material passes through the fixing nip portion N, the pressure in the latter part becomes higher than that in the fast part. This configuration is hereinafter sometimes referred to as “trailing end pressurization”.

Note that the pressure profile was measured by using a roller pressure distribution measurement system (PINCH) made by NITTA Corporation so that pressure-sensitive sensor sheets having piezoelectric elements (not shown) were sandwiched at the fixing nip portion N.

In the case where the fixing unit having the pressure profile of the fixing nip portion N in this modification was used and other conditions were set to the same as in Example 1, the gloss value after toners of yellow, magenta, cyan, and black were fixed in a process black state on the recording material P was 65.

In this modification, by applying high pressure on the downstream side of the recording material transporting direction at which toner temperature is high, the surface of toner becomes smooth. Furthermore, in this modification, as compared to Example 1, the pressure applied to the recording material is rapidly decreased (after reference numeral 128 in FIG. 6D) immediately before the recording material P exits the fixing nip portion N on the downstream side of the fixing nip portion N in the recording material transporting direction. Thus, the recording material P is rapidly separated from the fixing film 31. The separation speed of toner T fixed on the recording material P from the fixing film 31 is increased, and hence an apparent viscoelastic characteristic of the toner T is increased, so that the toner T is difficult to attach to the fixing film 31, thereby suppressing hot offset. The hot offset is suppressed such that the surface of toner becomes more smooth, and hence the gloss value can be increased to be higher than in Example 1.

From the above, as in this modification, higher gloss can be achieved by setting the pressure profile of the fixing nip portion N to be the trailing end pressurization. Note that the pressure profile of the fixing nip portion N was defined on the basis of the shape of the fixing heater 33, but the pressure profile is not limited thereto as long as the trailing end pressurization is achieved. For practical example, the trailing end pressurization can be achieved by setting a force applied to the pressure stay 35 from the pressure unit to be stronger at the trailing end than at the leading end of the fixing nip portion N. Furthermore, in regard to the trailing end pressurization, the pressure force at the most trailing end of the nip does not need to be maximum, and the pressure force only needs to be substantially stronger on the downstream side than on the upstream side. Furthermore, the configurations are not limited to those in FIG. 6A to FIG. 6D as long as the separation speed of the recording material P becomes higher than normal.

Example 2

Basic configurations and operations of an image forming apparatus in Example 2 are the same as those of the image forming apparatus in Example 1. Thus, in the image forming apparatus in Example 2, elements having the same or corresponding functions or configurations as in the image forming apparatus in Example 1 are denoted by the same reference symbols as in Example 1, and detailed descriptions thereof are omitted. Example 2 has an object to provide an image forming apparatus capable of selecting the gloss value of a black image from a low gloss mode and a high gloss mode. In the low gloss mode corresponding to low gloss, a black image is printed in single-color black, and in the high gloss mode corresponding to high gloss, a black image is printed by using toners of four colors of yellow, magenta, cyan, and black.

Figure 7:
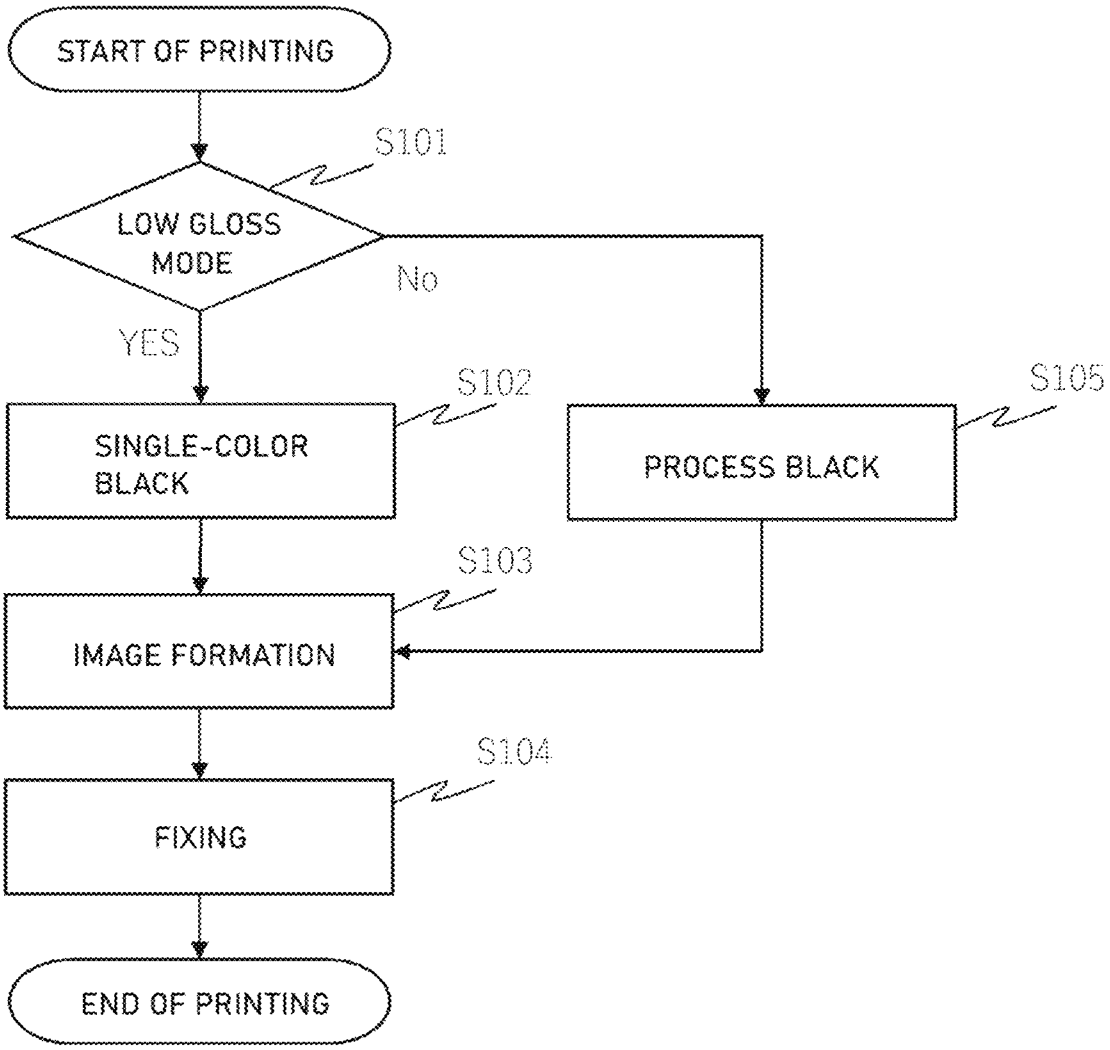
FIG. 7 is a flowchart illustrating an execution procedure in Example 2.

FIG. 7 illustrates a flowchart for describing Example 2. After the start of printing, in Step S101, a user selects the low gloss mode or the high gloss mode. The user may selects the mode by using user input unit such as an operation panel provided to the apparatus main body 100*a*, or may select the mode by a printing instruction from an external terminal. Alternatively, the control unit 60 may select the mode by using analyzing image data. When the low gloss mode is selected, the flow proceeds to Step S102, and when the high gloss mode is selected, the flow proceeds to Step S105.

In Step S102 as the low gloss mode, the control unit 60 outputs black image data by using single-color black for a black image in image information transmitted from the terminal. In Step S103, the control unit 60 performs image forming operation by controlling each component in the image forming apparatus 100 on the basis of the image data. Then, in Step S104, the fixing unit 30 performs fixing operation, and the printing is finished.

On the other hand, in Step S105 corresponding to the case where the high gloss mode is selected, the control unit 60 outputs image data by using process black using toners of four colors of yellow, magenta, cyan, and black for a black image in image information transmitted from the terminal. After that, in Step S103, the control unit 60 performs image forming operation by controlling each component in the image forming apparatus 100 on the basis of the image data. Then, in Step S104, the fixing unit 30 performs fixing operation, and the printing is finished.

In Example 2, the gloss value of black in the low gloss mode was 18, and the gloss value of black in the high gloss mode was 58. On the other hand, in a comparative example, the gloss value of black in the low gloss mode was 18, and the gloss value of black in the high gloss mode was 40. Thus, in Example 2, black gloss in the high gloss mode was able to be increased.

Note that, when controlling the low gloss mode and the high gloss mode, the adjustment of fixing temperature and the change of process speed may be used as well. By increasing the fixing temperature or reducing the process speed, the gloss value increases.

As described above, according to Example 2, an image forming apparatus capable of selecting the gloss value of a black image between the low gloss mode and the high gloss mode can be provided.

As described above, conventionally, when a process black image (typically, black image using toners of four colors of YMCK) is fixed, toner having a low viscoelastic characteristic receives excessive heat to cause hot offset, and the gloss value decreases. Thus, in Examples 1 and 2 in the present disclosure, in the case of forming a black image by using process black in order to increase the gloss value such as a photographic image, when toner disposed at a position closest to a recording material is referred to as "lower layer toner", toner disposed at a position farthest from the recording material is referred to as "upper layer toner", and toner disposed between the lower layer toner and the upper layer toner is referred to as "intermediate layer toner", the storage elastic modulus of the lower layer toner becomes highest, the storage elastic modulus of the upper layer toner becomes the second highest, and the storage elastic modulus of the intermediate layer toner becomes lowest. In this manner, the influence of hot offset can be reduced to suppress the decrease of the gloss value. Furthermore, in the present disclosure, in the case where a low gloss black image such as a character image is needed, single-color black used as the lower layer toner disposed at the position closest to the recording material can be used to decrease the gloss value. Thus, a high gloss black image that supports a photographic image can be achieved without causing hot offset, and a low gloss black image that supports black characters can be achieved.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-106882, filed on Jun. 29, 2023, which is hereby incorporated by reference wherein in its entirety.

What is claimed is:

1. An image forming apparatus configured to form a plurality of toner images by using toner of a plurality of colors and superimpose the plurality of toner images to perform printing on a recording material, the plurality of toners including a first toner, a second toner, and a third toner of different colors, the image forming apparatus comprising:

an image forming unit configured to form a first toner image using the first toner, a second toner image using the second toner, and a third toner image using the third toner;

a transfer unit for transferring in a superimposed manner onto the recording material the first toner image, the second toner image, and the third toner image in this order, which is an order closer to the recording material; and a fixing unit having a heating unit for heating the recording material from a side where the toner image is transferred, the fixing unit being configured to heat and melt the toner image by the heating unit and fix the toner image onto the recording material, wherein, among the first toner, the second toner, and the third toner, the first toner has a highest elastic modulus, and the second toner has a lowest elastic modulus, the color of the first toner is black, and when forming a black image, single-color black using only the first toner and process black using all the plurality of toners are selectable.

2. The image forming apparatus according to claim 1, wherein a mode for forming an image is selectable between a high gloss mode and a low gloss mode, and in the high gloss mode, the black image is formed with the process black, and in the low gloss mode, the black image is formed with the single-color black.

3. The image forming apparatus according to claim 1, wherein, when the black image is a photographic image, the black image is formed with the process black, and when the black image is a character image, the black image is formed with the single-color black.

4. The image forming apparatus according to claim 1, wherein the image forming unit is configured to form a fourth toner image by further using a fourth toner of color that is different from the color of the second toner and the color of the third toner, and the second toner, the third toner, and the fourth toner correspond to any of colors of yellow, cyan, and magenta.

5. The image forming apparatus according to claim 1, wherein the fixing unit comprises a fixing film having the heating unit built therein, and a pressure roller configured to form a fixing nip portion for pressurizing the recording material between the pressure roller and the fixing film, and the recording material is transported to the fixing nip portion such that a surface, onto which the toner image has been transferred, of the recording material is directed toward the fixing film.

6. The image forming apparatus according to claim 5, wherein, at the fixing nip portion, a pressure force on a downstream side in a transporting direction of the recording material is higher than a pressure force on an upstream side in the transporting direction.

7. The image forming apparatus according to claim 6, wherein the heating unit is disposed over a region from a leading end to a trailing end of the fixing nip portion in the transporting direction of the recording material, and the heating unit has a protruding shape that protrudes toward the pressure roller on the trailing end side such that the pressure force on the downstream side in the transporting direction is high.

8. The image forming apparatus according to claim 1, wherein the image forming unit comprises a first image forming unit configured to form the first toner image, a second image forming unit configured to form the second toner image, and a third image forming unit configured to form the third toner image, the image forming unit further comprises an intermediate transfer member on which the plurality of toner images are transferred in a superimposed manner in an order of the third toner image, the second toner image, and the first toner image; and the plurality of toner images are transferred onto the recording material from the intermediate transfer member.

* * * * *